United States Patent [19]

Takahashi

[11] Patent Number: 5,499,268
[45] Date of Patent: Mar. 12, 1996

[54] ADAPTIVE EQUALIZER CAPABLE OF COMPENSATING FOR CARRIER FREQUENCY OFFSET

[75] Inventor: Kyo Takahashi, Mitaka, Japan

[73] Assignee: Japan Radio Co., Ltd., Tokyo, Japan

[21] Appl. No.: 404,842

[22] Filed: Mar. 20, 1995

Related U.S. Application Data

[63] Continuation of Ser. No. 162,339, Dec. 3, 1993.

[30] Foreign Application Priority Data

Dec. 9, 1992 [JP] Japan .................................. 4-329245
Dec. 15, 1992 [JP] Japan .................................. 4-334501
Dec. 17, 1992 [JP] Japan .................................. 4-337587

[51] Int. Cl.$^6$ .......................... H03H 7/30; H03H 7/40; H03K 5/159
[52] U.S. Cl. ...................... 375/231; 375/232; 375/233; 375/324; 375/350; 364/724.2; 329/307
[58] Field of Search .................................. 375/229–233, 375/235, 266, 324, 331, 344, 350; 364/724.19, 724.2; 329/307, 325, 360; 333/28 R; 455/337

[56] References Cited

U.S. PATENT DOCUMENTS

| | | | |
|---|---|---|---|
| 4,532,640 | 7/1985 | Bremer et al. | 375/120 |
| 4,621,366 | 11/1986 | Cain et al. | 375/13 |
| 5,153,527 | 10/1992 | Yaguchi | 375/13 |
| 5,228,062 | 7/1993 | Bingham | 375/97 |
| 5,297,165 | 3/1994 | Ueda et al. | 375/13 X |
| 5,311,545 | 5/1994 | Critchlow | 375/14 |
| 5,311,546 | 5/1994 | Paik et al. | 375/97 X |

FOREIGN PATENT DOCUMENTS 2067461 12/1992 Canada.

0369406 5/1990 European Pat. Off. .

OTHER PUBLICATIONS

NEC Research and Development, No. 45, Apr. 1977, Tokyo, Japan, pp. 38–49, Akashi et al., "A High Performance Digital QAM 9600 bit/s Modem".
Shahid U. H. Qureshi, Adaptive Equalization, Sep. 1985, pp. 1349–1387, Proceedings of the IEEE, vol. 73, No. 9, New York, U.S.A.

Primary Examiner—Stephen Chin
Assistant Examiner—Amanda T. Le
Attorney, Agent, or Firm—Frishauf, Holtz, Goodman, Langer & Chick

[57] ABSTRACT

An adaptive equalizer includes a multiplier for multiplying, by corrective data, an output signal from a filter unit for compensating for a signal distortion to which input digital data are subjected, a decision unit for estimating and outputting symbols of output data from the multiplier, a subtractor for subtracting an output signal of the decision unit from the output data from the multiplier, multipliers for inversely correcting the output signals from the decision unit and the subtractor which are corrected by the multiplier, a coefficient updating unit for updating the coefficients of the filter unit based on an output signal from the multiplier which inversely corrects the output signal from the subtractor, and a frequency offset estimating unit for estimating corrective data based on a frequency offset on the basis of the output signal from the multiplier which inversely corrects the output signal from the subtractor, and using the estimated corrective data as corrective data for the multiplier which multiplies the output signal from the filter unit by corrective data. An output signal from the multiplier which inversely corrects the output signal from the decision unit is fed back to a feedback filter of the filter unit.

10 Claims, 9 Drawing Sheets

FIG.8  PRIOR ART
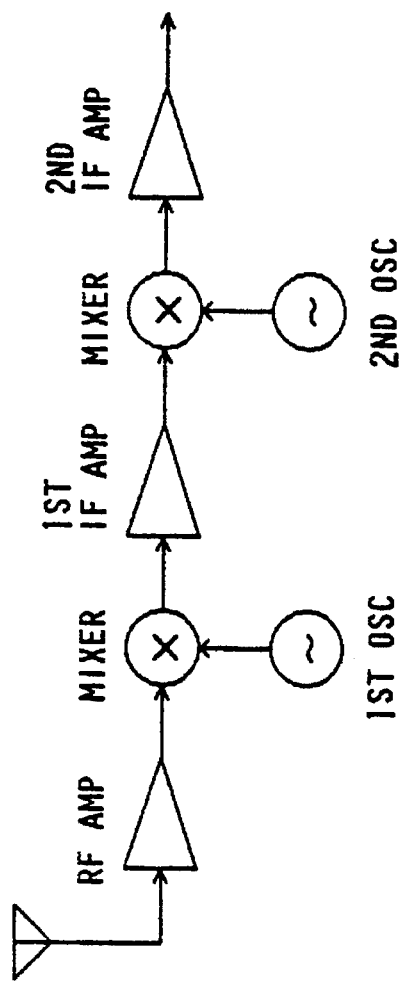
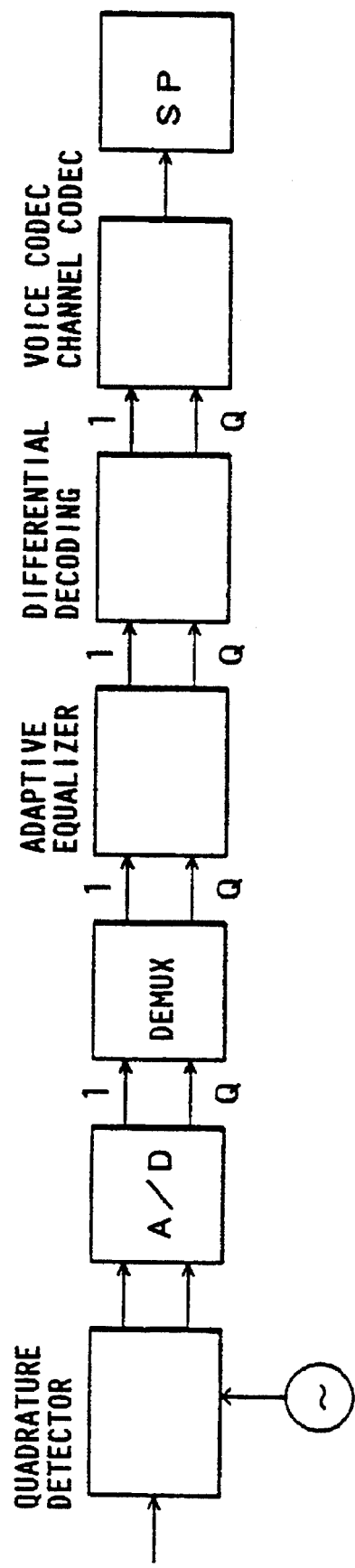

5,499,268

ADAPTIVE EQUALIZER CAPABLE OF COMPENSATING FOR CARRIER FREQUENCY OFFSET

This application is a Continuation of application Ser. No. 08/162,339, filed Dec. 3, 1993.

BACKGROUND OF THE INVENTION

1. Field of the Invention

The present invention relates to an adaptive equalizer for use in digital cellular receiver terminals or the like, and more particularly to an adaptive equalizer capable of compensating for a deterioration in the channel characteristics which results from a carrier frequency offset.

2. Description of the Related Art

Heretofore, land mobile communications systems, typically automobile telephone system, have been analog communications systems. To meet demands for a rapid increase in the number of subscribers to such land mobile communications systems, more diverse types of data to be transmitted, and compatibility with ISDN (Integrated-Services Digital Network), efforts are being made to develop digital mobile communications systems.

For example, the Telecommunication Industries Association in the U.S.A. established in 1989 the digital automobile telephone standards which are summarized as follows:

Frequency band: 800/900 MHz
Access method: TDMA
Audio encoding method: 13 kbps VSELP
Number of channels per wave: 3
Carrier interval: 60 kHz (30 kHz interleave)
Modulation method: π/4-shift DQPSK
Base station radius: 0.5~20 km A π/4-shift DQPSK (π/4-shift differentially encoded quadrature phase shift keying) signal is a signal which is produced by differentially encoding symbols to be transmitted and then subjecting them to π/4-shift QPSK.

The process of π/4-shift QPSK will be described below. The differentially encoding process that has no effect on an understanding of the present invention will not be described below.

In π/4-shift QPSK, a series of bits of digital signals 0 and 1 is divided into pairs of bits, and the phase angle $\theta_k$ of a high-frequency sine wave is determined depending on one of 2-bit combinations 00, 01, 10, 11 (a 2-bit combination $\{X_k, Y_k\}$ is referred to as a "symbol"). A sine wave $S(t)$ having a phase angle $\theta_k$ corresponding to the kth symbol is expressed by:

$$S(t)=\cos(\omega_c t+\theta_k) \quad k=1, 2, 3, 4 \quad (-T/2 \leq t \leq T/2) \tag{1}$$

where $$\theta_k=\pm\pi/4, \pm 3\pi/4 \tag{2},$$

$\omega_c$ is the angular frequency of a carrier sine wave (if a carrier frequency is $f_c$, then $\omega_c=2\pi f_c$), and T is the duration of one symbol.

The sine wave $S(t)$ may also be expressed as follows:

$$S(t)=a_k \cos(\omega_c t)+b_k \sin(\omega_c t) \tag{3}$$

where $$(a_k, b_k)=(1/\sqrt{2},1/\sqrt{2}), (-1/\sqrt{2},1/\sqrt{2}), (-1/\sqrt{2},-1/\sqrt{2}), (1/\sqrt{2},-1/\sqrt{2}) \tag{4}$$

$$a^2+b^2=1 \tag{5}.$$

The values of $(a_k, b_k)$ represent the components of a symbol on an I-Q rectangular Cartesian coordinate plane composed of an in-phase axis (I axis) and a quadrature axis (Q axis).

FIG. 8 of the accompanying drawings shows, by way of example, a conventional digital cellular receiver for receiving QPSK-modulated waves. It is assumed that the digital cellular receiver has received a signal R(t) that is expressed by:

$$R(t)=a' \cos(\omega_c t)+b' \sin(\omega_c t) \tag{6}$$

where (a', b') is $(a_k, b_k)$ that has been received (the suffix k is omitted).

In the digital cellular receiver shown in FIG. 8, the received signal R(t) expressed by the equation (6) is subjected to quadrature detection to reproduce the combinations $(a_k, b_k)$ (and further to determine phase differences between succeeding combinations $(a_k, b_k)$ in differential decoding) thereby reproducing the symbols, and then demodulate the symbols into a series of bits 0 and 1 which is original serial signals.

The quadrature detector divides the received signal expressed by the equation (6) into two signals, multiplies one of the signal by a sine wave $\cos(\omega_c t)$ which is of the same frequency and phase as the transmitted carrier, and multiplies the other signal by a sine wave $\sin(\omega_c t)$. This quadrature detection process is called a synchronous detection process. The results of the process are given as follows:

$$R(t) \cos(\omega_c t)=(1/2)(a'+a' \cos 2\omega_c t+b' \sin 2\omega_c t) \tag{7},$$

and $$R(t) \sin(\omega_c t)=(1/2)(b'-b' \cos 2\omega_c t+a' \sin 2\omega_c t) \tag{8}.$$

The signals expressed by the above equations (7) and (8) are passed through a low-pass filter to remove multiple frequency components therefrom, thus obtaining (1/2)a', (1/2)b'.

In the above synchronous detection process, however, it is necessary to generate a carrier whose frequency and phase are equal to those of the transmitted carrier. Methods of extracting and reproducing such a carrier in a receiver generally include inverse modulation, multiplication, and Costas loop. These methods reproduce a carrier based on waveform information contained in the received signal. Therefore, if the received signal has a distorted waveform due to multipath fading, for example, then they fail to extract and reproduce a carrier with high accuracy. Under such an adverse condition, the synchronous detection process cannot be relied upon.

In conventional digital communications between stationary stations, there has been employed an adaptive equalizer to compensate for a decoding error rate because they are also susceptible to multipath fading. FIG. 9 of the accompanying drawings illustrates, for example, an adaptive equalizer in the digital communication terminal shown in FIG. 8.

An output signal (a', b') from the synchronous detector is inputted to a demultiplexer which selects a signal of its own slot and sends it to the adaptive equalizer.

As shown in FIG. 9, the adaptive equalizer comprises a filter unit composed of a feed-forward filter and a feedback filter for processing a complex input signal whose real part is the I component of the output signal from the synchronous detector and imaginary part is the Q component of the output signal from the synchronous detector, the feed-forward and feedback filters having complex coefficients, a decision unit for determining the phase of an output signal from the filter unit, a complex adder for calculating an equalization error signal, a coefficient updating unit for updating the coefficients of the feed-forward and feedback filters based on the equalization error signal according to an algorithm, and a training signal generator for training the adaptive equalizer.

The input signal (a', b') is filtered by the filter unit to remove a waveform distortion due to multipath fading therefrom, and then sent to the decision unit. If it is assumed that the filter unit outputs a signal ($a_{of}$, $b_{of}$), then the decision unit determines which phase of the equation (4) the output signal from the filter unit corresponds to, and outputs a signal ($a_{dec}$, $b_{dec}$) corresponding to the phase. The complex adder determines the difference ($a_{of}$-$a_{dec}$, $b_{of}$-$b_{dec}$) between the output signal ($a_{of}$, $b_{of}$) from the filter unit and the output signal ($a_{dec}$, $b_{dec}$) from the decision unit, and outputs the difference as an equalization error signal. The coefficient updating unit updates the coefficients of the feed-forward and feedback filters. The output signal ($a_{dec}$, $b_{dec}$) from the decision unit is fed back to the feedback filter. The adaptive equalizer of this type is referred to as a decision feedback equalizer, which is known to be effective in compensating for a delay dispersion of a received signal due to multipath fading.

Digital mobile communication devices are more susceptible to multipath fading than conventional digital communication devices for use between stationary stations because they are often required to communicate with each other in locations such as between buildings or the like in cities. Therefore, the receivers of digital mobile communication terminals should be equipped with an oscillator for generating a detecting carrier to carry out detection (quasi-synchronous detection) similar to the synchronous detection using the oscillated detecting carrier.

Since the frequency of the transmitted carrier is known, the oscillator in the receiver is required to generate a carrier having the same frequency as the frequency of the transmitted carrier. However, such a requirement may not necessarily be met. It is also impossible to eliminate the phase difference. In the quasi-synchronous detection, therefore, it is necessary to effect quadrature detection using the detecting carrier whose frequency and phase are slightly different from those of the transmitted carrier, for reproducing a transmitted series of symbols.

The quadrature detector for carrying out the quasi-synchronous detection divides the received signal expressed according to the equation (6) into two signals, multiplies one of the signals by a sine wave $\cos(\omega't+\theta)$, and multiplies the other signal by a sine wave $\sin(\omega't+\theta)$, where $\omega'$ is the angular frequency of the detecting carrier which is different from the frequency of the transmitted carrier, and $\theta$ the phase difference between the detecting carrier and the transmitted carrier. The signals produced by the above multiplication are passed through a low-pass filter, which outputs the following signals:

$$R(t) \cos(\omega't+\theta) \to (1/2)[a' \cos(\Delta\omega t+\theta) - b' \sin(\Delta\omega t+\theta)] \quad (9)$$

$$R(t) \sin(\omega't+\theta) \to (1/2)[a' \sin(\Delta\omega t+\theta) + b' \cos(\Delta\omega t+\theta)] \quad (10)$$

where $\Delta\omega$ is the difference between the transmitted carrier $\omega_c$ and the detecting carrier $\omega'$, and called a carrier offset.

As can be seen from the equations (9) and (10), the signal (a', b') produced as a result of the quasi-synchronous detection is expressed as a vector, on the I-Q plane, whose absolute value is $(1/2)(a'^2+b'^2)^{1/2}$ and which keeps rotating at an angular velocity $\Delta\omega$. While the vector (a', b') is rotating, if the angular velocity $\Delta\omega$ exceeds about 10 Hz, then the error rate is large with the normal decoding process. Therefore, it is necessary to detect and compensate for a carrier offset with some means.

The manner in which the adaptive equalizer responds to a carrier offset will be described below.

If an input signal produced by quadrature detection of a signal which is received by the receiver and applied to the adaptive equalizer contains a carrier offset $\Delta\omega$, then the spectrum $Reql(\omega)$ of the input signal is represented by:

$$Reql(\omega)=W(\omega-\Delta\omega)G((\omega-\Delta\omega)H(\omega-\Delta\omega) \quad (11)$$

where $W(\omega)$ is the spectrum of a transmitted series of symbols $w_i$, $H(\omega)$ the spectrum of an impulse response $h(t)$ of the transmission path, and $G(\omega)$ the spectrum of an impulse response $g(g)$ of the waveform shaping filter. These spectrums are frequency-shifted by the carrier offset $\Delta\omega$. Since the filter unit of the adaptive equalizer realizes a transfer function $1/\{G(\omega-\Delta\omega)H(\omega-\Delta\omega)\}$ to equalize the input signal, it produces an output signal:

$$\begin{aligned}Ofil(\omega) &= W(\omega-\Delta\omega)G((\omega-\Delta\omega)H(\omega-\Delta\omega) \cdot \\ &\quad 1/\{G(\omega-\Delta\omega)H(\omega-\Delta\omega)\} \\ &= W(\omega-\Delta\omega).\end{aligned}$$

The spectrum of the received symbols is shifted by the carrier offset $\Delta\omega$. An inverse Fourier transform of the output signal is expressed by:

$$Ofil(\omega)=w_i\exp\{j\,\Delta\omega t\}$$

where $i=0, 1, 2, 3, \ldots$ $$iT \leq t < (i+1)T$$

T: symbol interval (sec).

Therefore, the received symbols in the output signal from the filter unit rotate at the angular velocity $\Delta\omega$ without stopping at rest, and hence the equalization error signal contains the carrier offset $\Delta\omega$.

Accordingly, even the adaptive equalizer cannot compensate for the carrier offset. It is one of the tasks to be achieved in developing digital mobile communications receivers to provide appropriate means for compensating for a carrier offset.

SUMMARY OF THE INVENTION

It is therefore an object of the present invention to provide an adaptive equalizer having means for compensating for a carrier offset between the frequency of a carrier used for quasi-synchronous detection and the frequency of a transmitted carrier in a digital mobile communications receiver.

To achieve the above object, the principles of the present invention are based on the fact that an equalization error signal of an adaptive equalizer contains a carrier offset, and equalization error signals are accumulated to extract the carrier offset to compensate for the carrier offset.

According to a first aspect of the present invention, there is provided an adaptive equalizer comprising a filter unit for compensating for a signal distortion to which input digital data supplied to the filter unit is subjected, correcting means for correcting output data from the filter unit based on corrective data, a decision unit responsive to output data from the correcting means for determining and outputting symbols of the digital data, first inversely correcting means for inversely correcting output data from the decision unit which have been corrected by the correcting means, second inversely correcting means for inversely correcting difference output data produced by subtracting the output data of the decision unit from the output data of the correcting means and corrected by the correcting means, coefficient updating means for updating filter coefficients of the filter unit based on output data from the second inversely correcting means, and frequency offset estimating means for estimating corrective data based on an offset of a carrier frequency in the output data from the filter unit on the basis of the output data from the second inversely correcting means, and outputting the estimated corrective data as the corrective data to the correcting means.

The correcting means may comprise a complex multiplier for multiplying the output data from the filter unit by the corrective data.

The first inversely correcting means may comprise complex conjugate converting means for converting the corrective data into complex conjugate data, and a first complex multiplier for multiplying output data from the complex conjugate converting means by the output data from the decision unit, and the second inversely correcting means may comprise a second complex multiplier for multiplying the output data from the complex conjugate converting means by the difference output data.

The frequency offset estimating means may comprise converting means for converting the output data from the second inversely correcting means into a phase quantity based on the output data from the second inversely correcting means, a first accumulator/adder for accumulating and adding phase quantities outputted from the converting means for a predetermined period, a second accumulator/adder for accumulating and adding output data from the first accumulator/adder, and a vector data converter for converting output data from the second accumulator/adder into unit vector data, as the corrective data, which has a phase angle based on the output data from the second accumulator/adder.

According to a second aspect of the present invention, there is provided an adaptive equalizer comprising a filter for compensating for a transmission distortion to which an input signal comprising a training signal and data following the training signal is subjected, decision means for estimating and outputting symbols of the input signal in response to an output signal from the filter, training signal generating means for outputting a training signal, first selecting means for selecting one of an output signal from the decision means and the training signal outputted from the training signal generating means, coefficient updating means for controlling the coefficients of the filter based on an output signal which is produced by subtracting an output signal of the first selector means from the output signal of the filter, memory means for storing the input signal, a modulator for successively modulating signals, as a carrier, having a plurality of frequencies within a predetermined frequency range containing an expected frequency offset with the training signal read from the memory means, second selecting means for supplying a modulated output signal from the modulator to the filter, adding means for adding an output signal, per carrier frequency, which is produced by subtracting the output signal of the filter supplied with the training signal outputted through the second selecting means, from the training signal outputted through the first selecting means, and correcting means for converting the carrier frequency corresponding to a minimum value of a sum output signal from the adding means into a corrective signal based on the carrier frequency, and correcting the input signal with the corrective signal.

The correcting means may comprise converting means for converting the carrier frequency corresponding to the minimum value of the sum output signal from the adding means into a unit vector having a phase angle based on the carrier frequency, and a complex multiplier for multiplying the input signal read from the memory means by the unit vector outputted from the converting means, and supplying a product output signal through the second selecting means to the filter.

The correcting means may comprise converting means for converting the carrier frequency corresponding to the minimum value of the sum output signal from the adding means into a voltage based on the carrier frequency, and a local oscillator in a stage preceding the adaptive equalizer for controlling an oscillating frequency in response to the voltage which is supplied as a corrective control voltage from the converting means.

According to a third aspect of the present invention, there is provided an adaptive equalizer comprising memory means for storing an input signal comprising a training signal and data following the training signal, a modulator for successively modulating a plurality of frequencies, as a carrier, within a predetermined frequency range containing an expected frequency offset with the training signal read from the memory means, a filter for compensating for a transmission distortion to which the input signal is subjected, first selecting means for selecting and supplying one of an output signal from the modulator and stored contents of the memory means to the filter, correcting means for correcting an output signal from the filter with corrective data, decision means for estimating and outputting symbols of the input signal in response to an output signal from the correcting means, training signal generating means for outputting a training signal, second selecting means for selecting one of an output signal from the decision means and the training signal outputted from the training signal generating means, inversely correcting means for inversely correcting a difference output signal produced by subtracting an output signal of the second selecting means from the output signal of the correcting means and corrected by the correcting means, coefficient updating means for updating the coefficients of the filter based on an output signal from the inversely correcting means, initial value estimating means for adding, per carrier frequency, the output signal from the inversely correcting means when the output signal from the modulator is selected by the first selecting means and the training signal outputted from the training signal generating means is selected by the second selecting means, and converting a carrier frequency corresponding to a minimum value of a sum into corrective data as an estimated initial value based on the carrier frequency, and frequency offset estimating means for estimating corrective data based on the output signal from the inversely correcting means, using the estimated initial value from the initial value estimating means as an initial corrective value, when the stored contents of the memory means are selected by the first selecting means and the output signal from the decision means is selected by the second selecting means, and outputting the estimated corrective data to the correcting means.

According to a fourth aspect of the present invention, there is provided an adaptive equalizer comprising memory means for storing an input signal comprising a training signal and data following the training signal, a modulator for successively modulating a plurality of frequencies, as a carrier, within a predetermined frequency range containing an expected frequency offset with the training signal read from the memory means, a filter for compensating for a transmission distortion to which the input signal is subjected, first selecting means for selecting and supplying one of an output signal from the modulator and stored contents of the memory means to the filter, correcting means for correcting an output signal from the filter with corrective data, decision means for estimating and outputting symbols of the input signal in response to an output signal from the correcting means, training signal generating means for outputting a training signal, second selecting means for selecting one of an output signal from the decision means and the training signal outputted from the training signal generating means, first inversely correcting means for inversely correcting an output signal from the second selecting means which is corrected by the correcting means, and feeding back the inversely corrected output signal to the filter, second inversely correcting means for inversely correcting a difference output signal produced by subtracting an output signal of the second selecting means from the output signal of the correcting means and corrected by the correcting means, coefficient updating means for updating the coefficients of the filter based on an output signal from the second inversely correcting means, initial value estimating means for adding, per carrier frequency, the output signal from the second inversely correcting means when the output signal from the modulator is selected by the first selecting means and the training signal outputted from the training signal generating means is selected by the second selecting means, and converting a carrier frequency corresponding to a minimum value of a sum into corrective data as an estimated initial value based on the carrier frequency, and frequency offset estimating means for estimating corrective data based on the output signal from the second inversely correcting means, using the estimated initial value from the initial value estimating means as an initial corrective value, when the stored contents of the memory means are selected by the first selecting means and the output signal from the decision means is selected by the second selecting means, and outputting the estimated corrective data to the correcting means.

With the adaptive equalizer according to the first aspect of the present invention, the signal distortion is compensated for by the filter unit, the output data from the filter unit are corrected based on the corrective data estimated by the frequency offset estimating means, and symbols of the output data from the filter unit which are corrected are estimated and outputted as output data from the decision unit. The output data from the decision unit which have been corrected by the correcting means are inversely corrected by the first inversely correcting means into uncorrected output data from the filter unit, which are fed back to a feedback filter of the filter unit. Equalization error data are calculated by subtracting the output data of the decision unit from the output data of the filter unit, and then inversely corrected by the second inversely correcting means into uncorrected equalization error data. Based on the uncorrected equalization error data, the coefficients of the filter unit are updated by the coefficient updating means. Corrective data based on a carrier frequency offset in the output data from the filter unit are estimated by the frequency offset estimating means on the basis of the uncorrected equalization error data, and the output data from the filter unit are corrected by the estimated corrective data. Therefore, effects based on transmission characteristics of a transmission path are corrected, and an error based on the frequency offset is corrected.

If the frequency offset estimating means comprises the converting means for converting the output data from the second inversely correcting means into a phase quantity based on the output data from the second inversely correcting means, the first accumulator/adder for accumulating and adding phase quantities outputted from the converting means for a predetermined period, the second accumulator/adder for accumulating and adding output data from the first accumulator/adder, and the vector data converter for converting output data from the second accumulator/adder into unit vector data, as the corrective data, which has a phase angle based on the output data from the second accumulator/adder, then the output data from the second inversely correcting means, i.e., the uncorrected equalization error data, are converted into the phase quantity based on the equalization error data by the converting means, and the phase quantities are added so that variations based on the distortion which the input signal has suffered in the transmission path are averaged and eliminated by being accumulated and added. The phase quantity based on the frequency offset is outputted, and the phase quantities are accumulated and added so as to be converted into the unit vector data having the phase angle corresponding to the accumulated and added output data. The output data from the filter unit are corrected based on the unit vector data, and hence the error based on the frequency offset is corrected.

With the adaptive equalizer according to the second aspect of the present invention, the training signal of the input signal is read from the memory means, and the signals, as a carrier, having a plurality of frequencies in the predetermined frequency range containing the expected frequency offset are modulated with the read training signal by the modulator at carrier frequencies at given frequency intervals. The modulated output signal is supplied through the second selecting means to the filter, which compensates for the transmission distortion. The training signal outputted through the first selecting means is subtracted from the output signal from the filter. The difference output signal is added per carrier frequency, and the minimum value of the sum output signal is searched for and converted into the corrective signal based on the carrier frequency corresponding to the minimum value. The input signal read from the memory means is corrected on the basis of the converted corrective signal.

If the input signal has suffered an offset of frequency f in the preceding stage, then the input signal has been rotated by the phase angle $\theta$ corresponding to the frequency f. When the input signal is modulated with a carrier frequency $(-f)$ which inversely gives a rotation by the phase angle $(-\theta)$, the output signal from the filter becomes equal to the training signal outputted from the training signal generating means, thus canceling the offset from the modulated output signal. Therefore, the carrier frequency corresponding to the minimum value of the sum output signal is the frequency offset. As a result, the frequency offset is corrected by the above correction.

If the correcting means comprises the converting means for converting the carrier frequency corresponding to the minimum value of the sum output signal from the adding means into a unit vector having a phase angle based on the carrier frequency, and the complex multiplier for multiplying the input signal read from the memory means by the unit vector outputted from the converting means, and supplying a product output signal through the second selecting means to the filter, then the unit vector outputted from the converting means has a phase angle $(-\theta)$, and the frequency offset is corrected by multiplying, with the complex multiplier, the unit vector having the phase angle $(-\theta)$ by the input signal read from the memory means and rotated through the phase angle $(\theta)$ by the frequency offset.

If the correcting means comprises the converting means for converting the carrier frequency corresponding to the minimum value of the sum output signal from the adding means into a voltage based on the carrier frequency, and a quadrature-detection carrier oscillator as a local oscillator in a stage preceding the adaptive equalizer for controlling an oscillating frequency in response to the voltage which is supplied as a corrective control voltage from the converting means, then the converting means outputs a voltage corresponding to the frequency −f, and the oscillating frequency of the local oscillator is corrected by the voltage. Therefore, the frequency offset of the frequency f which has occurred in the stage preceding the adaptive equalizer can be corrected.

With the adaptive equalizer according to the third aspect of the present invention, the output signal from the modulator is selected by the first selecting means, and the training signal outputted from the training signal generating means is selected by the second selecting means. The training signal of the input signal is read from the memory means, and a plurality of frequencies, as a carrier, in a predetermined frequency range containing an expected frequency offset are successively modulated by the training signal read from the memory means at predetermined frequency intervals. The modulated output signal is supplied through the first selecting means to the filter, which compensates for the transmission distortion. The training signal outputted through the second selecting means is subtracted from the output signal from the filter. The difference output signal is added per carrier frequency, and converted into the corrective data, as an estimated initial value, based on the carrier frequency corresponding to the minimum value.

Then, the stored contents read from the memory means are selected by the first selecting means, and the output signal from the decision means is selected by the second selecting means. The stored contents read from the memory means and outputted through the first selecting means are supplied to the filter to compensate for the transmission distortion. The output signal from the filter is corrected by the correcting means based on the corrective data outputted from the frequency offset estimating means. The output signal outputted from the decision means through the second selecting means is subtracted from the corrected output signal from the filter. The difference output signal which has been corrected by the correcting means is inversely corrected by the inversely correcting means, and the coefficients of the filter are updated based on the inversely corrected difference output signal. The corrective data are estimated on the basis of the inversely corrected difference output signal. Specifically, the corrective data are estimated using the estimated initial value as an initial value, and the estimated corrective data are outputted as corrective data to the correcting means for use in correcting the output signal from the filter. Since the estimated initial value is used as an initial value for estimating the corrective data, the adaptive equalizer can compensate for a frequency offset in a wide range.

With the adaptive equalizer according to the fourth aspect of the present invention, the output signal from the modulator is selected by the first selecting means, and the training signal outputted from the training signal generating means is selected by the second selecting means. The training signal of the input signal is read from the memory means, and a plurality of frequencies, as a carrier, in a predetermined frequency range containing an expected frequency offset are successively modulated by the training signal read from the memory means at predetermined frequency intervals. The modulated output signal is supplied through the first selecting means to the filter, which compensates for the transmission distortion. The training signal outputted through the second selecting means is subtracted from the output signal from the filter. The difference output signal is added per carrier frequency, and converted into the corrective data, as an estimated initial value, based on the carrier frequency corresponding to the minimum value.

Then, the stored contents read from the memory means are selected by the first selecting means, and the output signal from the decision means is selected by the second selecting means. The stored contents read from the memory means and outputted through the first selecting means are supplied to the filter to compensate for the transmission distortion. The output signal from the filter is corrected by the correcting means based on the corrective data outputted from the frequency offset estimating means. The output signal outputted from the decision means through the second selecting means which has been corrected by the correcting means is inversely corrected by the first inversely correcting means, and the inversely corrected output signal from the decision means is fed back to the filter. As a result, a multipath distortion is removed.

The output signal outputted from the decision means through the second selecting means is subtracted from the corrected output signal from the filter. The difference output signal which has been corrected by the correcting means is inversely corrected by the second inversely correcting means,.and the coefficients of the filter are updated based on the inversely corrected difference output signal. The corrective data are estimated on the basis of the inversely corrected difference output signal. Specifically, the corrective data are estimated using the estimated initial value as an initial value, and the estimated corrective data are outputted as corrective data to the correcting means for use in correcting the output signal from the filter. Since the estimated initial value is used as an initial value for estimating the corrective data, the adaptive equalizer can compensate for a frequency offset in a wide range.

In the adaptive equalizer according to the third or fourth aspect of the present invention, the frequency offset estimating means may comprise converting means for converting the output signal from the inversely correcting means (second inversely correcting means) into a phase quantity based on the output signal from the inversely correcting means (second inversely correcting means), first accumulating/adding means for accumulating and adding phase quantities outputted from the converting means for a predetermined period, second accumulating/adding means for accumulating and adding output phase quantities from the first accumulating/adding means for a predetermined period, and a vector data converter for converting an output phase quantity from the second accumulating/adding means into a unit vector, as the corrective data, which has a phase angle based on the output phase quantity from the second accumulating/adding means. In such an arrangement, the output data from the inversely correcting means (second inversely correcting means), i.e., the uncorrected difference output signal, are converted into the phase quantity based on the difference output signal, and the phase quantities are added so that variations based on the distortion which the input signal has suffered in the transmission path are averaged and eliminated by being accumulated and added. The phase quantity based on the frequency offset is outputted, and the phase quantities are accumulated and added by the second accumulating/adding means so as to be converted into the unit vector data having the phase angle corresponding to the accumulated and added output data from the second accumulating/adding means. Since the output signal from the filter is corrected based on the unit vector data, the error based on the frequency offset is corrected.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a block diagram of a conventional digital cellular receiver; and

DETAILED DESCRIPTION OF THE PREFERRED EMBODIMENTS

1st Embodiment

Figure 1:
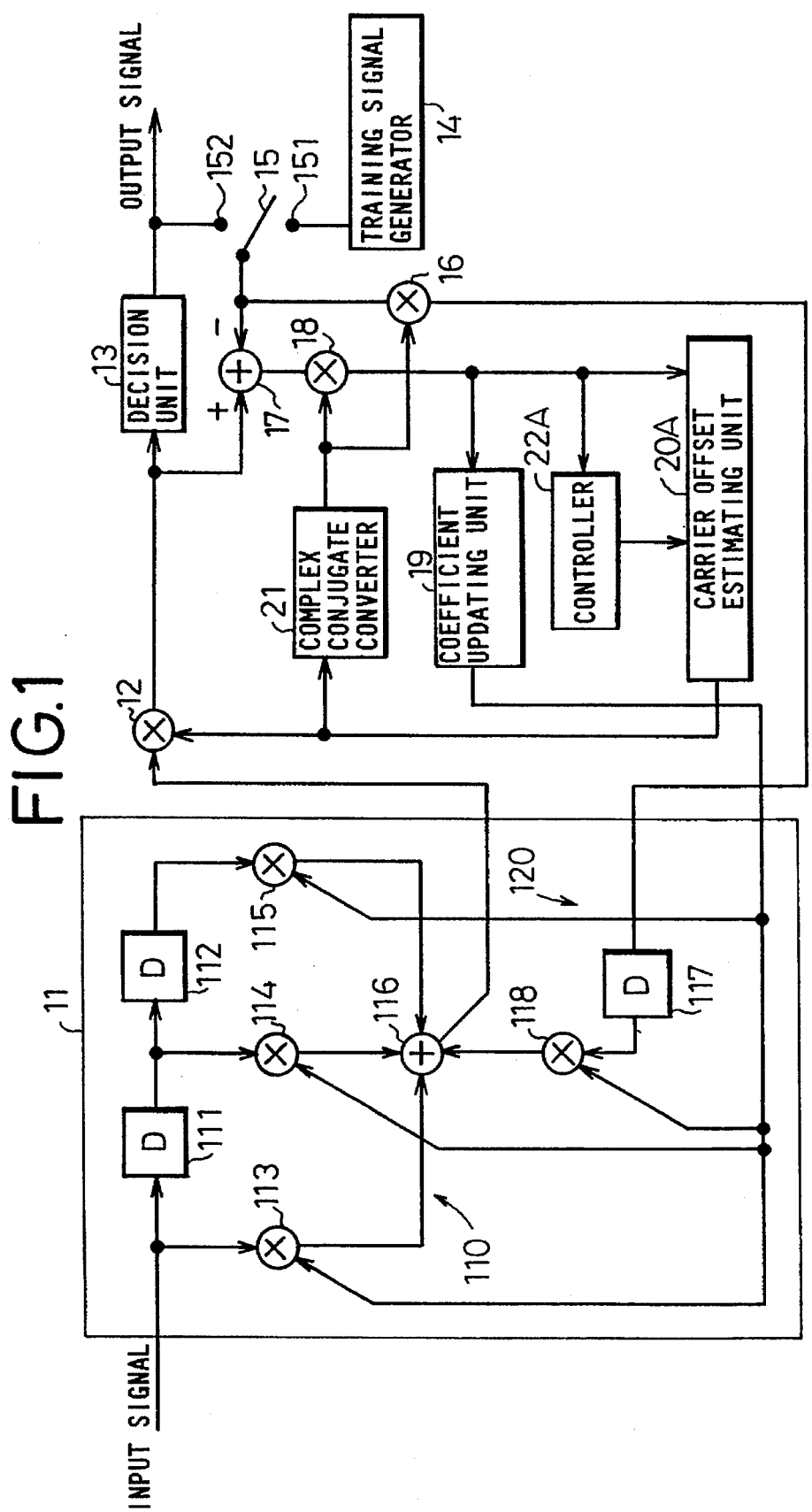
FIG. 1 is a block diagram of an adaptive equalizer according to a first embodiment of the present invention.

An adaptive equalizer according to a first embodiment of the present invention, as shown in FIG. 1, may replace the adaptive equalizer in the conventional digital cellular receiver shown in FIG. 8. Therefore, the I and Q components of an output signal of the quadrature detector shown in FIG. 8 are supplied through the A/D converter and the demultiplexer to the adaptive equalizer shown in FIG. 1. In the adaptive equalizer, the I and Q components are supplied as a complex signal whose real part composed of the I component and imaginary part composed of the Q component to a filter unit 11.

The filter unit 11 comprises a feed-forward filter 110 comprising unit delay operators 111, 112, complex coefficient multipliers 113, 114, 115, and a complex adder 116, and a feedback filter 120 comprising a unit delay operator 117 and a complex coefficient multiplier 118.

An output signal from the complex adder 116, i.e., a filter output signal ($a_o$, $b_o$) from the feed-forward filter 110, is supplied to a complex multiplier 12 which multiplies the filter output signal by a reversely rotating unit vector representing an estimated carrier offset that is estimated by a carrier offset estimating unit 20A for thereby canceling out a carrier offset contained in the output signal from the filter unit 11.

The complex multiplier 12 supplies its output signal to a decision unit 13 that determines which phase angle range of the equation (2) the distorted phase angle of the output signal from the filter unit 11 falls in. The decision unit 13 then outputs a signal having the I and Q components with a standardized phase angle expressed by the equation (2).

The output signal from the decision unit 13 is also supplied to a terminal 152 of a selector switch 15, and subtracted from the output signal from the complex multiplier 12 by a complex subtractor 17, thus producing an equalization error signal. The equalization error signal is a vector having, as its phase angle, the difference between the above distorted phase angle and the standardized phase angle expressed by the equation (2).

A training signal generated by a training signal generator 14 is supplied to the other terminal 151 of the selector switch 15. The selector switch 15 can thus select the training signal from the training signal generator 14 or the output signal from the decision unit 13.

The reversely rotating unit vector representing the estimated carrier offset estimated by the carrier offset estimating unit 20A is supplied to a complex conjugate converter 21 as well as the complex multiplier 12. The complex conjugate converter 21 converts the supplied unit vector into its conjugate complex signal, which is supplied to a complex multiplier 16 that multiplies the supplied conjugate complex signal by the output signal from the decision unit 13, thereby reversely correcting the corrected signal which has been corrected based on the estimated carrier offset by the complex multiplier 12, i.e., introducing the carrier offset again. The complex multiplier 16 supplies its reversely corrected output signal to the unit delay operator 117 of the feedback filter 120.

The equalization error signal from the complex subtractor 17 is also supplied to a complex multiplier 18, which multiplies it by the output signal from the complex conjugate converter 21, thereby inversely correcting the equalization error signal which has been corrected based on the estimated carrier offset by the complex multiplier 12, i.e., introducing the carrier offset again. The complex multiplier 18 supplies its inversely corrected output signal to a coefficient updating unit 19. The coefficient updating unit 19 updates the coefficients of the coefficient multipliers 113–115, 118 of the filter unit 11.

The output signal from the complex multiplier 18 is also applied to a controller 22A and also the carrier offset estimating unit 20A. The controller 22A accumulates the levels of equalization error signals for a certain period of time to monitor the operation of the adaptive equalizer. If the accumulated error is smaller than a predetermined value, then the controller 22A determines that the adaptive equalizer is operating normally, and turns on a switch 200A (see FIG. 2). If the accumulated error is in excess of the predetermined value, then the controller 22A determines that the adaptive equalizer is malfunctioning, and turns off the switch 200A thereby stopping the estimating operation of the carrier offset estimating unit 20A.

Figure 2:
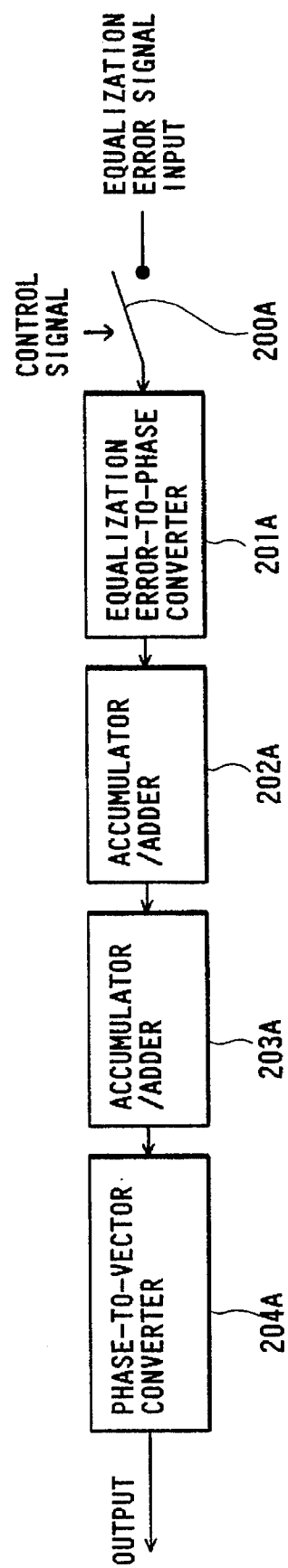
FIG. 2 is a block diagram of a frequency offset estimating unit in the adaptive equalizer according to the first embodiment.

As shown in FIG. 2, the carrier offset estimating unit 20A comprises the switch 200A, an equalization error-to-phase converter 201A for converting the inversely corrected equalization error signal supplied from the complex multiplier 18 through the switch 200A into a phase quantity, an accumulator/adder 202A for accumulating and adding phase quantities converted by the equalization error-to-phase converter 201A, an accumulator/adder 203A for accumulating and adding output signals from the accumulator/adder 202A, and a phase-to-vector converter 204A for converting an output signal from the accumulator/adder 203A into a reversely rotating unit vector having a corresponding phase angle and supplying the reversely rotating unit vector to the complex multiplier 12.

The carrier offset estimating unit 20A operates as follows: The inversely corrected equalization error signal supplied from the complex multiplier 18 through the switch 200A, i.e., a signal containing noise in the transmission path, phase and amplitude variations due to fading, and a phase rotation due to the carrier offset, is converted into a phase quantity by the equalization error-to-phase converter 201A.

Then, signals indicative of phase quantities from the equalization error-to-phase converter 201A are accumulated and added by the accumulator/adder 202A. When the signals indicative of phase quantities are accumulated and added for a certain period of time, the accumulated values of noise in the transmission path and phase and amplitude variations due to fading become zero, and the phase rotation due to the carrier offset amounts to an angular velocity $\phi_s$.

Output signals from the accumulator/adder 202A are also accumulated and added by the accumulator/adder 203A for the time of a one-symbol interval, and converted into a phase rotation quantity $k \cdot \phi_s$ per symbol (k represents the time of the one-symbol interval).

The phase rotation quantity $k \cdot \phi_s$ is then converted by the phase-to-vector converter 204A into a unit vector which has the phase rotation quantity and is reversely rotating. Thereafter, the reversely rotating unit vector is supplied to the complex multiplier 12, which reversely rotates the phase of the output signal from the filter unit 11 to cancel out the carrier offset.

If the input signal contains an excessive carrier offset and cannot be corrected by the output signal from the carrier offset estimating unit 20A, and the equalization error signal supplied to the controller 22A exceeds a predetermined level, then the controller 22A applies a control signal to turn off the switch 200A. At this time, the carrier offset estimating unit 20A outputs a unit vector having a phase angle that has been estimated in the preceding slot.

As described above, the adaptive equalizer according to the first embodiment of the present invention compensates for a distorted component, i.e., a fading component, produced in the transmission path, and also estimates a carrier offset from the equalization error signal and corrects the output signal from the filter unit based on the estimated carrier offset. The adaptive equalizer can thus compensate for a phase rotation caused by the carrier offset which results from the difference between the frequencies of the detecting carrier and the transmitted carrier in the quadrature detector, for thereby preventing the bit error rate from being deteriorated by the carrier offset.

In estimating the carrier offset, the distorted component that varies with time in the transmission path is removed by accumulation and addition for a certain period of time for extracting a phase quantity based on the carrier offset. Consequently, the carrier offset estimating unit is relatively simple in arrangement.

2nd Embodiment

Figure 4:
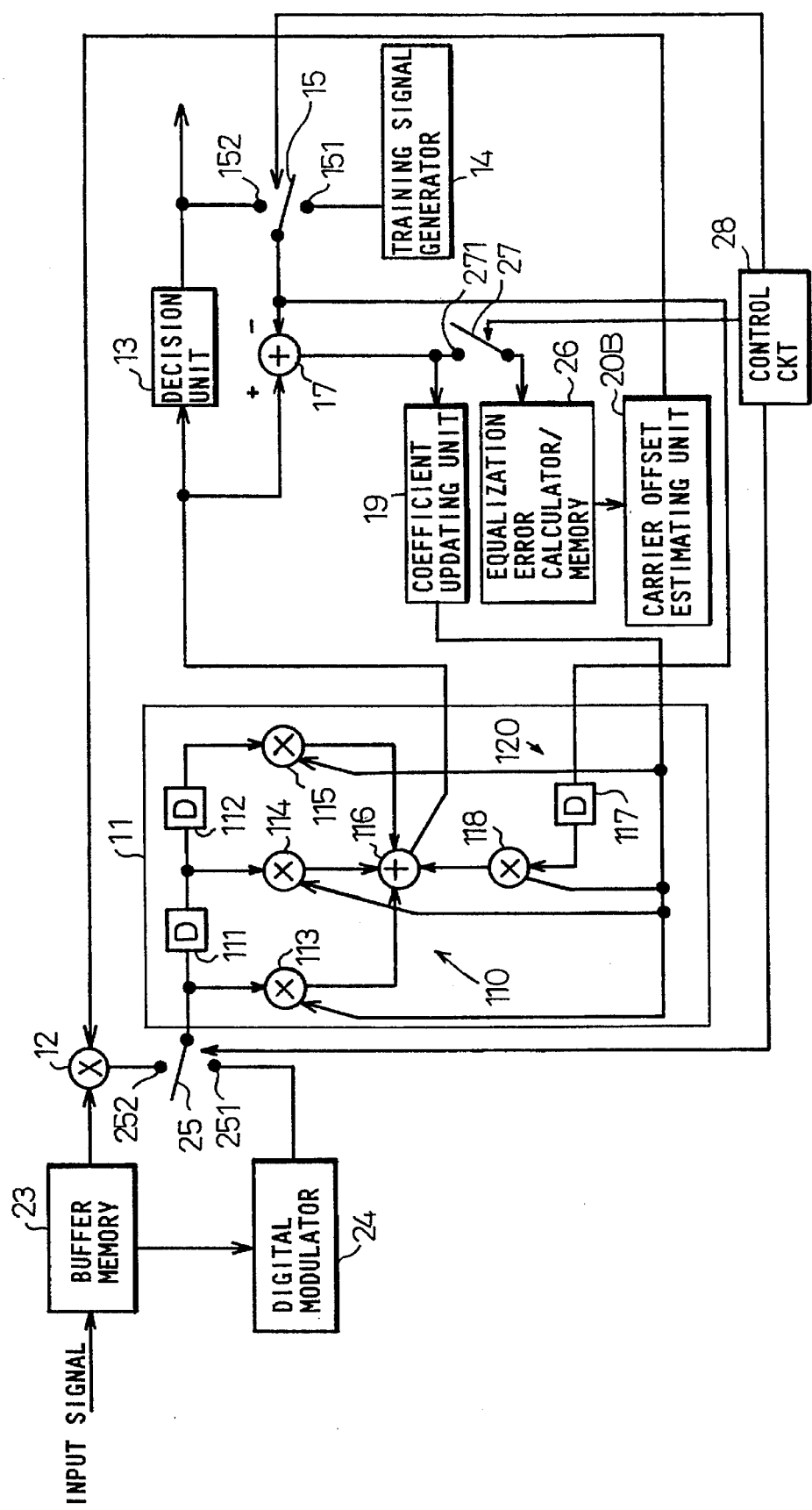
FIG. 4 is a block diagram of an adaptive equalizer according to a second embodiment of the present invention.

FIG. 4 shows an adaptive equalizer according to a second embodiment of the present invention. Those parts shown in FIG. 4 which are identical to those shown in FIG. 1 are denoted by identical reference numerals and will not be described in detail below.

Figure 3:
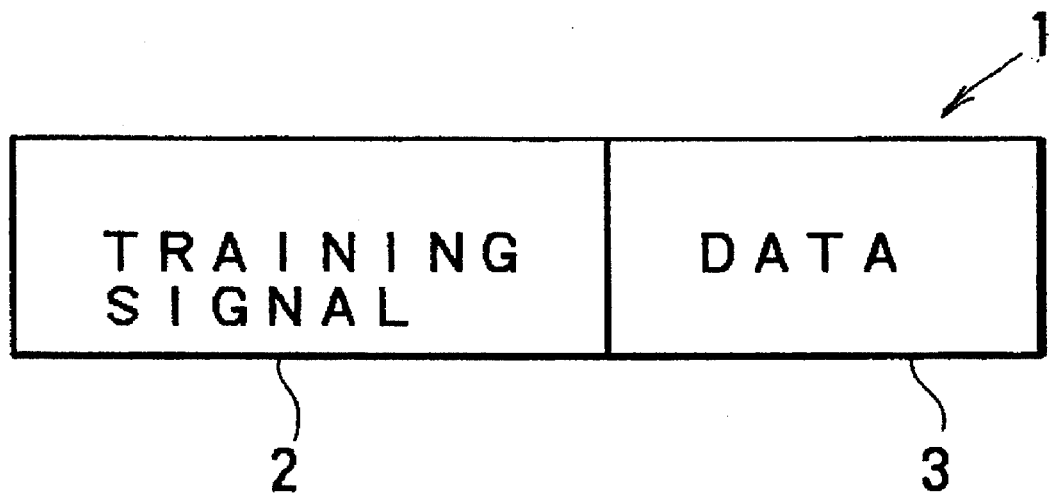
FIG. 3 is a diagram showing the format of input signal data.

As shown in FIG. 3, an input signal applied to the adaptive equalizer according to the second embodiment comprises a training signal 2 and data 3. As shown in FIG. 4, the training signal 2 and the data 3 are stored in a buffer memory 23. Then, the training signal stored in the buffer memory 23 is read and supplied to a digital modulator 24, which digitally modulates the training signal with carrier frequencies at the interval of a predetermined frequency $\Delta f$ within a carrier offset range of from $-f_{off}$ to $+f_{off}$ which is intentionally added. The digital modulator 24 outputs and applies the digital modulated signal to a terminal 251 of a selector switch 25, which can select the modulated signal.

After the training signal is read a predetermined number of times from the buffer memory 23, the training signal and the data stored in the buffer memory 23 are read and supplied to the complex multiplier 12, which multiplies them by estimated corrective data (described later on). The complex multiplier 12 supplies its output signal to the other terminal 252 of the selector switch 25, which can select the output signal from the complex multiplier 12. The digital modulated signal from the digital modulator 24 or the output signal from the complex multiplier 12, which is selected by the selector switch 25, is supplied to the filter unit 11.

The filter unit 11 is identical to the filter unit 11 according to the first embodiment. The output signal from the filter unit 11 is applied to the decision unit 13 that determines the phase of the output signal from the filter unit 11. The decision unit 13 supplies its output signal to the terminal 152 of the selector switch 15.

The training signal generated by the training signal generator 14 is supplied to the terminal 151 of the selector switch 15. The selector switch 15 can thus select the training signal from the training signal generator 14 or the output signal from the decision unit 13.

The selected output data from the selector switch 15 are fed back to the unit delay operator 117, i.e., the feedback filter 119 of the filter unit 11. The selected output data from the selector switch 15 is also subtracted from the output data from the filter unit 11, thus producing equalization error data. The equalization error data are supplied to the coefficient updating unit 19, which updates the coefficients of the coefficient multipliers 113~115, 118 of the filter unit 11, i.e., updates the filter coefficients based on the equalization error data.

The equalization error data are also supplied through a terminal 271 of a selector switch 27 to an equalization error calculator/memory 26. The equalization error calculator/memory 26 has a calculating unit for adding equalization error data with respect to all symbols supplied to the digital modulator 24 for each of the carrier frequencies, and a memory unit for storing the sum for each of the carrier frequencies.

The sum of equalization error data stored in the equalization error calculator/memory 26 is read into a carrier offset estimating unit 20B, which detects the minimum value of the sum, converts the detected minimum value into a phase angle, and adds the converted phase angle each time a symbol is read, for conversion into a unit vector with the converted phase angle. The carrier offset estimating unit 20B supplies the unit vector as corrective data to the complex multiplier 12 in synchronism with the reading of the symbols.

The selector switches 25, 15, 27 are controlled by a control circuit 28 to shift in different patterns in different modes (described below).

Operation of the adaptive equalizer according to the second embodiment will be described below with reference to Tables 1 through 4 below.

When the input signal 1 having a format as shown in FIG. 3 is supplied to the buffer memory 23, it is stored in the buffer memory 23. An initializing mode and a carrier offset estimating mode for the filter unit 11 are carried out using the training signal 2, and an adaptive equalizing mode is carried out using the training signal 2 and the data 3 according to the sequences described below. As described above, the range of carrier frequencies intentionally applied to the digital modulator 24 is the same as the range ($-f_{off}$ to $+f_{off}$ (Hz)) of the carrier offset which the received series of symbols is supposed to suffer, and the carrier frequencies change at the interval of the frequency $\Delta f$ (Hz).

(a) First, the initializing mode is carried out.

The initializing mode and the carrier offset estimating mode are related to each other as follows:

The filter coefficients are initialized with respect to all the symbols of the training signal for one carrier frequency, and then the carrier offset estimating mode is carried out with respect to all the symbols of the training signal for the same carrier frequency. Thereafter, the carrier frequency is varied by the frequency $\Delta f$, and then the filter coefficients are initialized and the carrier offset estimating mode is carried out.

Table 1 below shows the manner in which the initializing mode is carried out.

(a-1) The training signal of the input signal 1 stored in the buffer memory 23 is read and applied to the digital modulator 24, which modulates the training signal with a carrier frequency f. The modulated signal is supplied to the filter unit 11, which removes an intersymbol interference from the modulated signal by filtering.

(a-2) The output data from the filter unit 11 is supplied to the complex subtractor 17, which calculates the difference between the output data from the filter unit 11 and the training signal that is generated by the training signal generator 14 depending on the training signal read from the buffer memory 23, i.e., equalization error data.

(a-3) The equalization error data calculated by the complex subtractor 17 are supplied to the coefficient updating unit 19 thereby to update the filter coefficients of the filter unit 17 based on the equalization error data.

(a-4) The training operation based on the carrier frequency f is effected with respect to all the symbols of the training signal. When the training operation is finished, the filter coefficients are converged.

The initializing mode based on the carrier frequency f is followed by the carrier offset estimating mode that is carried out at the carrier frequency f. Table 2 below shows the manner in which the carrier offset estimating mode is carried out.

TABLE 1

| Read signal | Initializing mode Training signal | | | | |
|---|---|---|---|---|---|
| Carrier frequency | $-f_{off}$ | $-f_{off} + \Delta f$ | $-f_{off} + 2\Delta f$ | ... | $+f_{off}$ |
| Operating phase I | Setting of FC | Updating, Setting of FC | Updating, Setting of FC | Updating, Setting of FC | Updating, Setting of FC |
| Operating phase II | — | — | — | — | — |
| Operating phase III | — | — | — | — | — |
| Connected terminals of SW 25, 15, 27 | 25: 251 15: 151 27: Open | 25: 251 15: 151 27: Open | 25: 251 15: 151 27: Open | 25: 251 15: 151 27: Open | 25: 251 15: 151 27: Open |

FC: Filter coefficients (a-0) During the initializing mode, the selector switch 25 is connected to the terminal 251, the selector switch 15 is connected to the terminal 151, and the selector switch 27 is open under the control of the control circuit 28.

TABLE 2

| Read signal | Carrier offset estimating mode Training signal | | | | |
|---|---|---|---|---|---|
| Carrier frequency | $-f_{off}$ | $-f_{off} + \Delta f$ | $-f_{off} + 2\Delta f$ | ... | $+f_{off}$ |
| Operating phase I | Setting of FC | Updating, Setting of FC | Updating, Setting of FC | Updating, Setting of FC | Updating, Setting of FC |
| Operating phase II | Accumulating, adding of equalization error data | Accumulating, adding of equalization error data | Accumulating, adding of equalization error data | Accumulating, adding of equalization error data | Accumulating, adding of equalization error data |

TABLE 2-continued

| Read signal | Carrier offset estimating mode Training signal | | | | |
|---|---|---|---|---|---|
| Operating phase III | Searching for minimum value → Estimating phase angle | | | | |
| Connected terminals of SW 25, 15, 27 | 25: 251<br>15: 151<br>27: 271 | 25: 251<br>15: 151<br>27: 271 | 25: 251<br>15: 151<br>27: 271 | 25: 251<br>15: 151<br>27: 271 | 25: 251<br>15: 151<br>27: 271 |

FC: Filter coefficients (b-0) During the carrier offset estimating mode, the selector switch 25 is connected to the terminal 251, the selector switch 15 is connected to the terminal 151, and the selector switch 27 is connected to the terminal 271 under the control of the control circuit 28. In the carrier offset estimating mode, the filter coefficients obtained in the initializing mode are used as initial values.

(b-1) The training signal of the input signal 1 stored in the buffer memory 23 is read and applied to the digital modulator 24, which modulates the training signal with a carrier frequency f. The modulated signal is supplied to the filter unit 11.

(b-2) The output data from the filter unit 11 is supplied to the complex subtractor 17, which calculates the difference between the output data from the filter unit 11 and the training signal that is generated by the training signal generator 14 depending on the training signal read from the buffer memory 23, i.e., equalization error data.

(b-3) The equalization error data calculated by the complex subtractor 17 are supplied to the coefficient updating unit 19 thereby to update the filter coefficients of the filter unit 17 based on the equalization error data.

(b-4) At the same time, the equalization error data are supplied to the equalization error calculator/memory 26, which calculates, in its calculating unit, the sum of equalization error data with respect to all the symbols at the carrier frequency f supplied to the digital modulator 24. The calculated sum is stored in the memory unit of the equalization error calculator/memory 26 with respect to the carrier frequency f supplied to the digital modulator 24.

(c-0) Then, the carrier frequency f is increased by the frequency $\Delta f$. The initializing mode from (a-0) to (a-4) is carried out at the frequency (f+$\Delta f$), and then the carrier offset estimating mode from (b-0) to (b-4) is carried out at the frequency (f+$\Delta f$).

(c-1) The above process is repeated as the carrier frequency is varied from $-f_{off}$ to $+f_{off}$ at the interval $\Delta f$.

The stored contents of the equalization error calculator/memory 26 upon completion of the above operation are given in Table 3 below.

TABLE 3

| Frequency f | Accumulated and added equalization errors |
|---|---|
| $-f_{off}$ | $\alpha_1$ |
| $-f_{off} + \Delta f$ | $\alpha_2$ |
| $-f_{off} + 2\Delta f$ | $\alpha_3$ |
| . | . |
| . | . |
| $+f_{off} - \Delta f$ | $\alpha_{n+1}$ |
| $+f_{off}$ | $\alpha_n$ |

(c-2) When the operation up to the carrier frequency $+f_{off}$ is over, the carrier offset estimating unit 22 searches for the minimum value of all accumulated and added equalization error data stored in the equalization error calculator/memory 26, converts the minimum value into a phase angle based on a carrier frequency corresponding to the minimum value, and converts the converted phase angle into a unit vector having the converted phase angle. The unit vector is sent as corrective data to the complex multiplier 12. The unit vector having the phase angle (–θ) based on the minimum value of all accumulated and added equalization error data is sent as corrective data to the complex multiplier 12 for the reasons as follows:

If the input signal 1 has suffered an offset of frequency f in the preceding stage, then the input signal has been rotated by the phase angle θ. When the input signal is modulated with a carrier frequency –f which inversely gives a rotation by the phase angle (–θ), the output signal from the filter unit 11 becomes equal to the training signal outputted from the training signal generator 14, thus canceling the offset from the modulated output signal.

Therefore, the input signal which has been rotated by the phase angle θ can be corrected by being multiplied by the unit vector having a phase angle $(-\theta_1)$ based on a frequency $-f_1$ ($\approx -f$) where the sum of equalization error data is minimum.

Then, the adaptive equalizing mode is carried out following the completion of the carrier offset estimating mode. Table 4 below shows the manner in which the adaptive equalizing mode is carried out.

TABLE 4

| Read signal | Adaptive equalizing mode | |
|---|---|---|
| | Training signal | Data |
| Carrier frequency | — | — |
| Operating phase I | Updating, Setting of FC | Updating, Setting of FC |
| Operating phase II | Correction of each training signal with initial phase angle | Correction of data with estimated phase angle |
| Operating phase III | — | — |
| Connected terminals of SW 25, 15, 27 | 25: 252<br>15: 151<br>27: Open | 25: 252<br>15: 152<br>27: 271 |

FC: Filter coefficients (d-0) During the adaptive equalizing mode, the selector switch 15 is connected to the terminal 151 in a training signal period under the control of the control circuit 28, and the selector switch 15 is connected to the terminal 152, the selector switch 25 is connected to the terminal 252, and the selector switch 27 is open in a data equalizing period under the control of the control circuit 28. In the adaptive equalizing mode, the filter coefficients obtained in the carrier offset estimating mode are used as initial values.

(d-1) A training signal of the input signal 1 stored in the buffer memory 23 is read and applied to the complex multiplier 12, which multiplies the training signal by the initial unit vector as corrective data. The corrected signal is then filtered by the filter unit 11.

(d-2) The output data from the filter unit 11 is supplied to the complex subtractor 17, which calculates the difference between the output data from the filter unit 11 and the training signal that is generated by the training signal generator 14 depending on the training signal read from the buffer memory 23, i.e., equalization error data.

(d-3) The equalization error data calculated by the complex subtractor 17 are supplied to the coefficient updating unit 19 thereby to update the filter coefficients of the filter unit 17 based on the equalization error data.

(d-4) Following training signals are successively read, and the above process (d-1)~(d-3) is effected until all the training signals are finished. Each time the next training signal is read, the phase angle of the unit vector is rotated by the phase angle of the unit vector as the initial value in the carrier offset estimating unit 20B. The unit vector whose phase angle is multiplied by an integer is supplied as corrective data to the complex multiplier 12, which multiplies the output data from the filter unit 11 by the corrective data, thereby correcting the output data from the filter unit 11.

In the carrier offset estimating unit 20B, the converted phase angle is added each time a symbol is read because the phase angle of the input signal which has suffered the carrier offset is incremented by the phase angle $\theta$ per input signal so that it varies from $\theta$ to $2\theta$ to $3\theta$ . . . . In the adaptive equalizing mode, the phase angle $(-\theta_1)$ of the corrective data, i.e., the unit vector, is incremented by $(-\theta_1)$ each time the data is read from the buffer memory 23 so that the phase angle varies from $(-\theta_1)$ to $(-2\theta_1)$ to $(-3\theta_1)$ to $(-4\theta_1)$ . . . .

(d-5) After the reading of all training signals is finished, the selector switch 25 is connected to the terminal 152, and the data are successively read from the buffer memory 23. The read data are corrected by being multiplied by the unit vector which is rotated by the phase angle $\theta_1$ each time the data is read and which is outputted from the carrier offset estimating unit 20B, and the corrected data are supplied to and filtered by the filter unit 11.

(d-6) The output data from the filter unit 11 are supplied to the complex subtractor 17, which calculates the difference between the output data from the filter unit 11 and the output data from the decision unit 13 to produce equalization error data.

(d-7) The equalization error data calculated by the complex subtractor 17 are supplied to the coefficient updating unit 19 thereby to update the filter coefficients of the filter unit 17 based on the equalization error data for an adaptive equalizing process.

(d-8) The above operation is repeated until all the data are read from the buffer memory 23. Consequently, the carrier offset produced in the preceding stage such as a radio transmission unit can be compensated for.

In the adaptive equalizer according to the second embodiment, as described above, signals, as a carrier, having a plurality of frequencies in a predetermined frequency range including an expected carrier offset are successively modulated by the training signals of the input signal that are read from the buffer memory, and the modulated output signals are supplied to the filter unit. Output signals produced by subtracting the training signal outputted by the training signal generator from the output signals from the filter unit are added for each carrier frequency. The carrier frequency corresponding to the minimum value of the sum output signal is converted into a signal based on the carrier frequency, and the input signal is equalized by the converted signal. Therefore, the carrier offset which the input signal has suffered can be compensated for to prevent the error rate from being deteriorated.

3rd Embodiment

Figure 5:
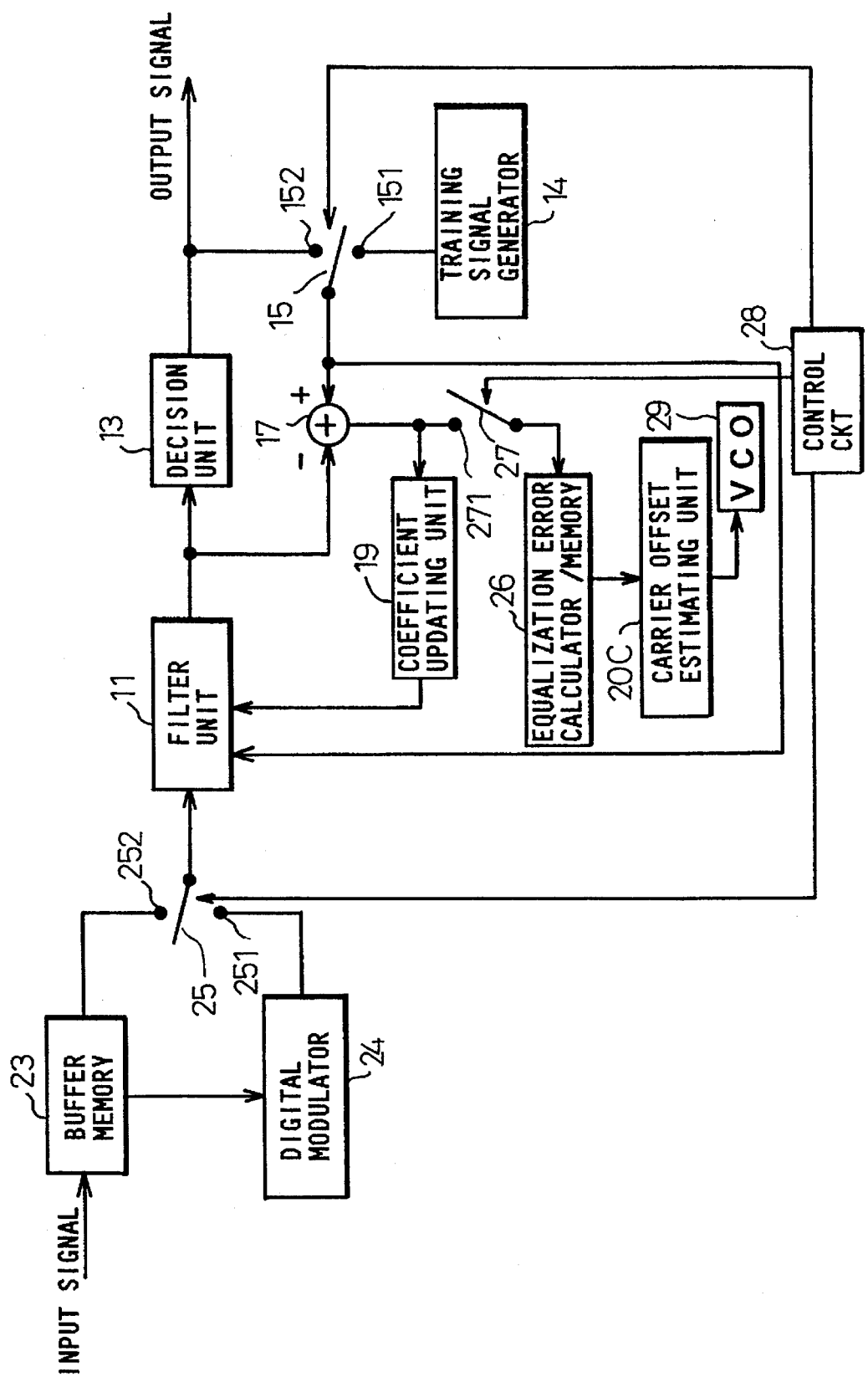
FIG. 5 is a block diagram of an adaptive equalizer according to a third embodiment of the present invention.

FIG. 5 shows an adaptive equalizer according to a third embodiment of the present invention.

The adaptive equalizer according to the third embodiment differs from the adaptive equalizer according to the second embodiment in that the complex multiplier 12 of the second embodiment is dispensed with, and the carrier offset estimating unit 20B of the second embodiment is replaced with a carrier offset estimating unit 20C and a voltage-controlled oscillator 29 which controls an oscillating frequency with the sum of a voltage outputted from the carrier offset estimating unit 20C and a voltage applied from another source (not shown), the voltage-controlled oscillator (VCO) 29 serving as a local oscillator in a frequency conversion stage or a quadrature-detection carrier oscillator. The other details of the adaptive equalizer according to the third embodiment are identical to those of the adaptive equalizer according to the second embodiment.

The carrier offset estimating unit 20C is of the same arrangement as the carrier offset estimating unit 20B. The carrier offset estimating unit 20C searches for a minimum frequency and converts the minimum frequency into a corresponding voltage. The voltage thus produced is maintained at a constant level irrespective of the reading of the training signal and the data from the buffer memory 23. The voltage is added to the voltage applied from the other source, and the sum voltage is applied as a control voltage to the voltage-controlled oscillator 29.

The adaptive equalizer according to the third embodiment operates in the same manner as the adaptive equalizer according to the second embodiment with respect to the initializing mode and the carrier offset estimating mode. In the adaptive equalizing mode, however, the converted voltage corresponding to the minimum frequency is maintained at a constant level irrespective of the reading of the training signal and the data from the buffer memory 23, and added to the voltage applied from the other source, and the sum voltage is applied as a control voltage to the voltage-controlled oscillator 29 for controlling the oscillating frequency.

Therefore, the oscillating frequency of the local oscillator in the frequency conversion stage is corrected based on the voltage outputted from the carrier offset estimating unit 20C to compensate for the carrier offset.

Furthermore, the adaptive equalizer according to the third embodiment converts the carrier frequency corresponding to the minimum value of the sum output signal into the unit vector having the phase angle based on the carrier frequency, multiplies the input signal read from the buffer memory by the converted unit vector, and supplies the product output signal to the filter unit. The multiplication process compensates for the carrier offset which the input signal suffers to prevent the error rate from being deteriorated.

In addition, the adaptive equalizer converts the carrier frequency corresponding to the minimum value of the sum output signal into the voltage based on the carrier frequency, and applies the converted voltage to the local oscillator in the stage preceding the adaptive equalizer. Consequently, the carrier offset which the input signal is subjected to is compensated for in the stage preceding the adaptive equalizer to prevent the error rate from being deteriorated.

4th Embodiment

Figure 6:
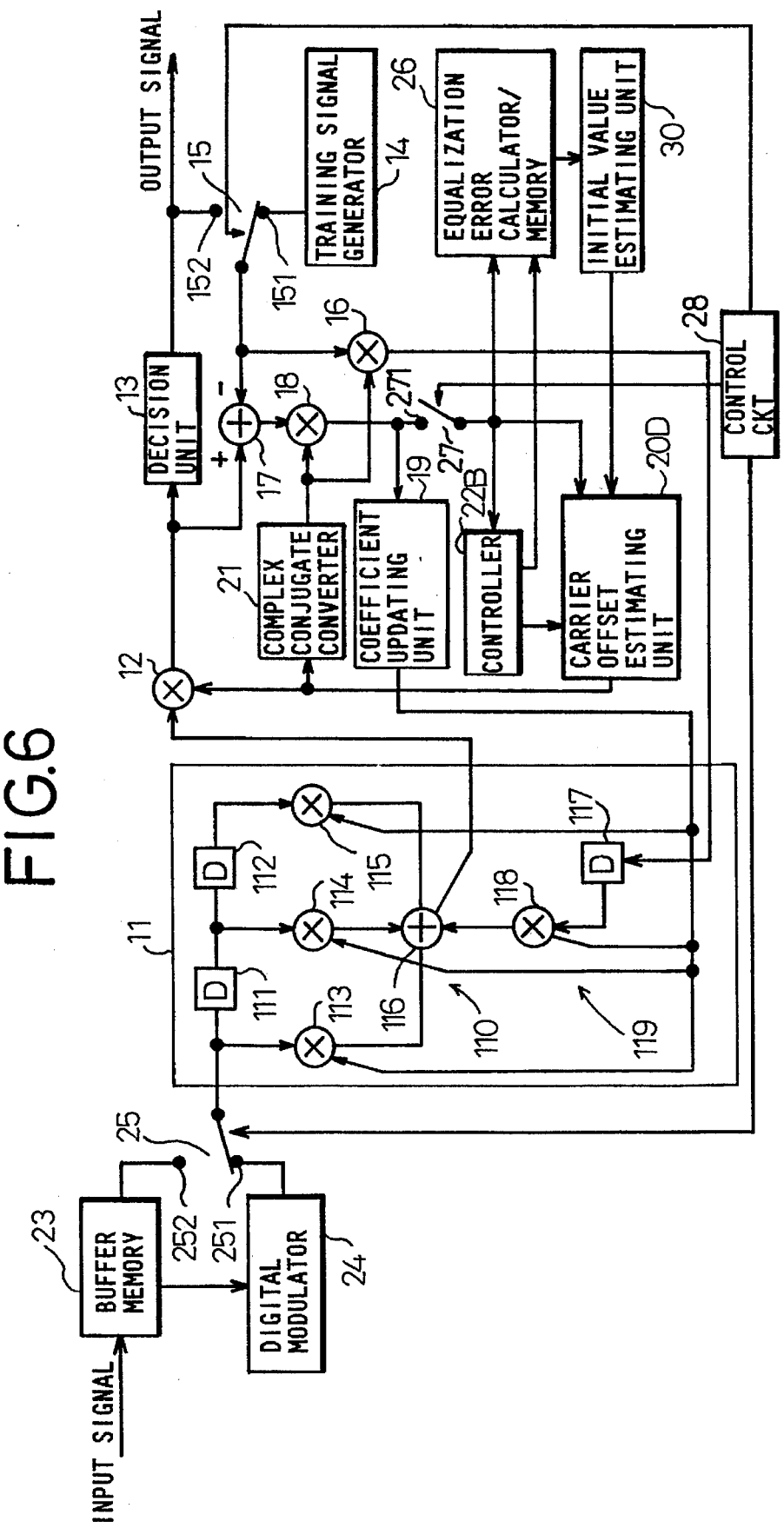
FIG. 6 is a block diagram of an adaptive equalizer according to a fourth embodiment of the present invention.
Figure 7:
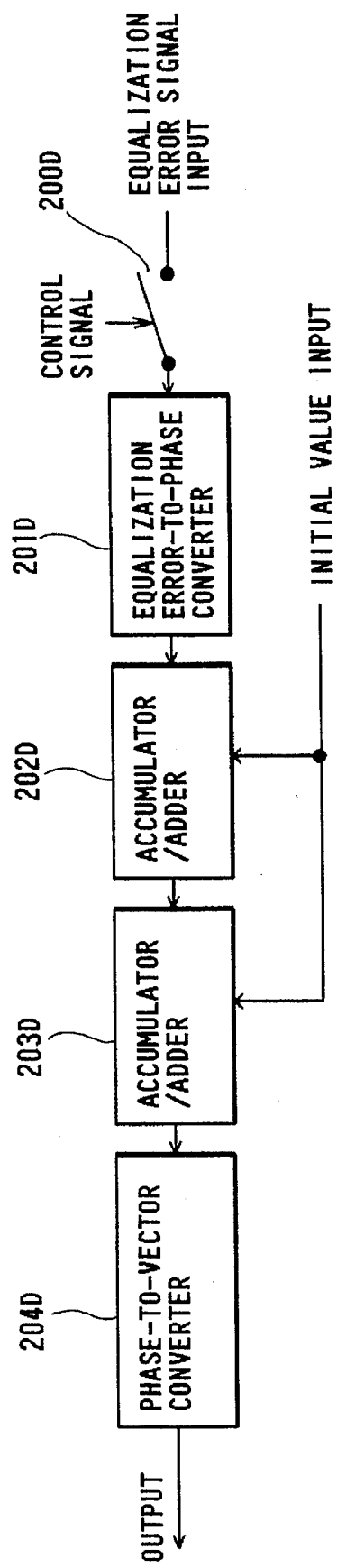
FIG. 7 is a block diagram of a frequency offset estimating unit in the adaptive equalizer according to the fourth embodiment.
Figure 9:
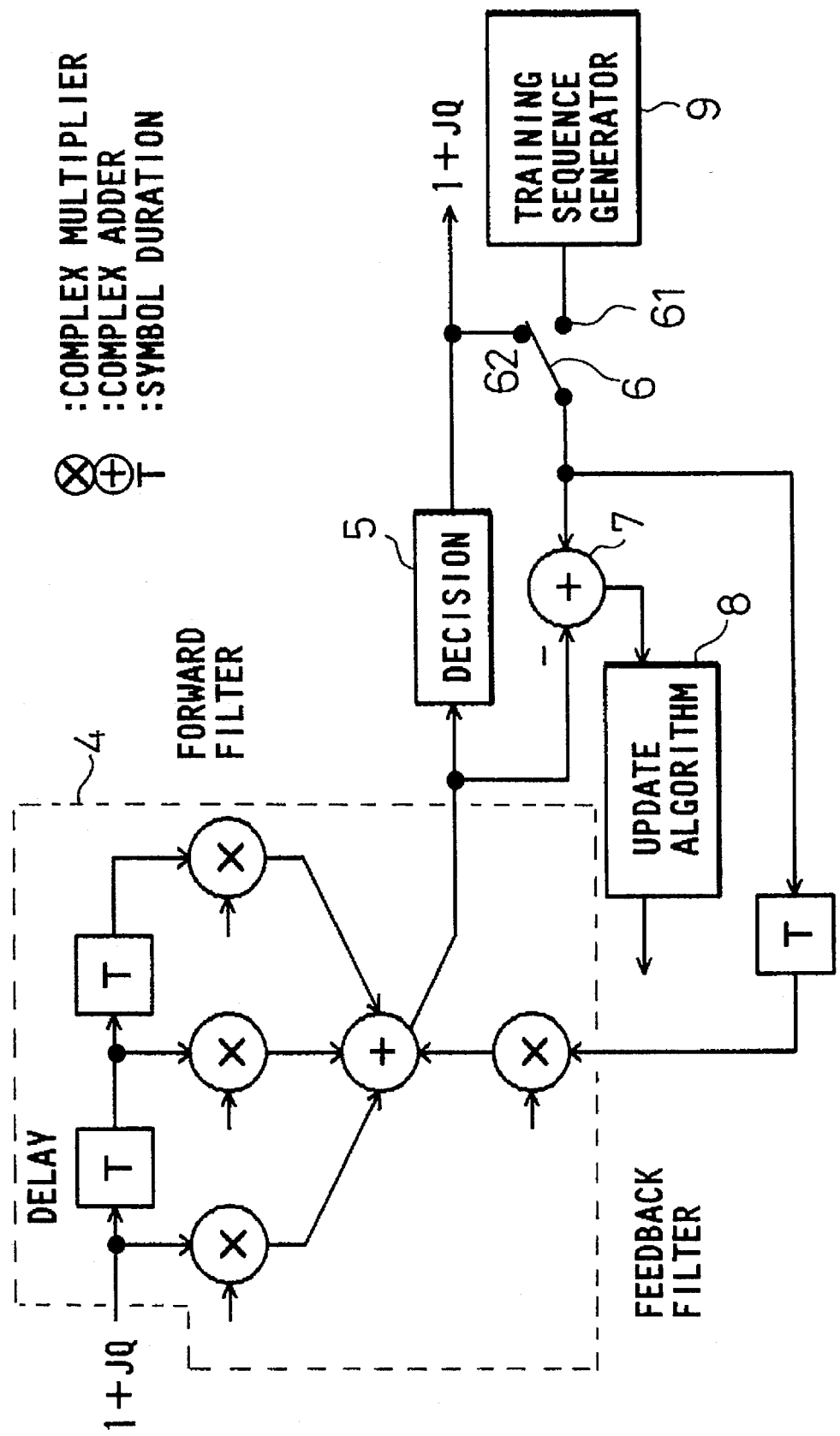
FIG. 9 is a block diagram of an adaptive equalizer in the conventional digital cellular receiver.

FIG. 6 shows an adaptive equalizer according to a fourth embodiment of the present invention.

According to the fourth embodiment, the buffer memory 23 and the digital modulator 24 in the second embodiment are incorporated in the adaptive equalizer according to the first embodiment. The adaptive equalizer according to the fourth embodiment includes a carrier offset estimating unit 20D and a controller 22B which are similar to the carrier offset estimating unit 20A and the controller 22A, respectively, in the first embodiment, and an equalization error calculator/memory 26 which is similar to the equalization error calculator/memory 26 in the second embodiment. The other components and their operation according to the fourth embodiment are identical to those according to the first through third embodiments, and will not be described in detail below.

The adaptive equalizer according to the fourth embodiment additionally has an initial value estimating unit 30. The initial value estimating unit 30 is supplied with the sum of equalization error data added per modulation frequency in the digital modulator 24 and stored in the equalization error calculator/memory 26, detects the minimum value of the sum, converts the detected minimum value into a phase angle based thereon, and outputs it as an initial phase angle.

As with the second embodiment, the adaptive equalizer according to the fourth embodiment operates in three modes, i.e., the initializing mode, the carrier offset estimating mode, and the adaptive equalizing mode. These modes are also identical to those according to the second embodiment except for details which will be described below.

During the initializing mode and the carrier offset estimating mode with the training signals, the carrier offset estimating unit 20D outputs a unit vector (1+j0), and the complex conjugate converter 21 generates a unit vector (1−j0). Therefore, during the initializing mode and the carrier offset estimating mode, the output signal from the filter unit 11 and the equalization error signal outputted from the complex subtractor 17 are not corrected or inversely corrected with respect to the carrier offset, and the coefficients of the filter unit 11 are set and updated (see Table 1).

The equalization error calculator/memory 26 does not operate in the initializing mode, but operates in a certain manner in the carrier offset estimating mode. More specifically, in the range of modulation frequencies from $-f_{off}$ to $+f_{off}$ in the digital modulator 24, the sum of equalization error data is accumulated in the equalization error calculator/memory 26 per frequency interval $\Delta f$. After the sum has been accumulated in the entire modulation frequency range, the initial value setting unit 30 detects the minimum value of the sum of equalization error data stored in the equalized error calculator/memory 26 (see Tables 2 and 3). The initial value setting unit 30 also generates an initial phase angle $(-\theta)$ corresponding to the detected minimum value of the sum of equalization error data.

Then, the adaptive equalizing mode is carried out. The adaptive equalizing mode is composed of a former stage which employs the training signals and a latter stage which employs the data (see Table 4). In the adaptive equalizing mode, the digital modulator 24 is inactive, and the training signals or the data read from the buffer memory 24 is supplied directly to the filter unit 11. In the adaptive equalizing mode, the equalization error calculator/memory 26 and the initial value setting unit 30 are also inactive. The carrier offset estimating unit 20D does not output the unit vector (1+j0), but outputs a unit vector (described below).

In the former stage which employs the training signals, the carrier offset estimating unit 20D outputs a unit vector having an initial phase angle $(-\theta)$ which has been obtained in the carrier offset estimating mode, to the complex multiplier 12. The complex multiplier 12 cancels out a phase angle $\theta$ corresponding to the carrier offset which has been estimated in the carrier offset estimating mode. In the former stage, the coefficients of the filter unit are updated using the training signals where the estimated carrier offset is canceled out.

When the former stage is over, the selector switch 15 is shifted to the terminal 152, the selector switch 27 is closed, and the data are read from the buffer memory 23. At this time, the adaptive equalizer according to the fourth embodiment operates in the same manner as the adaptive equalizer according to the first embodiment except that the buffer memory 23 is involved. The carrier offset estimating unit 20D also operates in exactly the same manner as the carrier offset estimating unit 20A according to the first embodiment.

Since the adaptive equalizer according to the fourth embodiment employs the training signals to estimate an initial value for a carrier offset correcting quantity, it is possible to obtain corrective data within a short period of time even when the carrier offset is large.

Moreover, a carrier offset while a normal signal is being received is corrected on the basis of a phase quantity based on the carrier offset component, which phase quantity is extracted by accumulating and adding distorted components in the transmission path over a given period of time. Consequently, the carrier offset estimating unit is relatively simple in arrangement.

Although certain preferred embodiments of the present invention has been shown and described in detail, it should be understood that various changes and modifications may be made therein without departing from the scope of the appended claims.

What is claimed is:

1. An adaptive equalizer comprising:

a filter for compensating for a transmission distortion to which an input signal is subjected, wherein the input signal comprises a training signal and data following the training signal;

decision means for estimating and outputting symbols of the input signal in response to an output signal from said filter;

training signal generating means for outputting a training signal;

a first selector for selecting one of an output signal from said decision means and the training signal outputted from said training signal generating means;

coefficient updating means for controlling coefficients of said filter based on an output signal which is produced by subtracting an output signal of said first selector from the output signal of said filter;

a memory for storing the input signal;

a modulator for successively modulating signals, as a carrier, having a plurality of frequencies within a predetermined frequency range containing an expected frequency offset with the training signal read from said memory;

a multiplier for multiplying the input signal read from said memory by a corrective signal;

a second selector for selectively supplying one of output signals from said multiplier and said modulator to said filter;

an adder for adding, while the input signal is the training signal, an output signal, per carrier frequency, which is produced by subtracting the output signal of said filter supplied with a modulated training signal outputted through said modulator and said second selector, from the training signal outputted through said first selector; and correcting means for converting the carrier frequency corresponding to a minimum value of a sum output signal from said adder into said corrective signal based on said carrier frequency while the input signal is the training signal, and for supplying said corrective signal to said multiplier while the input signal is the data.

2. An adaptive equalizer according to claim 1, wherein said corrective signal is a unit vector having a phase angle based on the carrier frequency corresponding to the minimum value of the sum output signal from said adder, and said multiplier is a complex multiplier for multiplying the input signal read from said memory by said unit vector.

3. An adaptive equalizer according to claim 1, wherein said correcting means comprises:

converting means for converting the carrier frequency corresponding to a minimum value of a sum output signal from said adder into a voltage based on said carrier frequency; and a local oscillator in a stage preceding the adaptive equalizer for controlling an oscillating frequency in response to the voltage which is supplied as a corrective control voltage from said converting means.

4. An adaptive equalizer comprising:

a memory for storing an input signal comprising a training signal and data following the training signal;

a modulator for successively modulating a plurality of frequencies, as a carrier, within a predetermined frequency range containing an expected frequency offset with the training signal read from said memory;

a filter for compensating for a transmission distortion to which the input signal is subjected;

a first selector for selecting and supplying one of an output signal from said modulator and stored contents of said memory to said filter;

correcting means for correcting an output signal from said filter with corrective data;

decision means for estimating and outputting symbols of the input signal in response to an output signal from said correcting means;

training signal generating means for outputting a training signal;

a second selector for selecting one of an output signal from said decision means and the training signal outputted from said training signal generating means;

inversely correcting means for inversely correcting a difference output signal produced by subtracting an output signal of said second selector from the output signal of said correcting means and corrected by said correcting means;

coefficient updating means for updating coefficients of said filter based on an output signal from said inversely correcting means;

initial value estimating means for adding, per carrier frequency, the output signal from said inversely correcting means when the output signal from said modulator is selected by said first selector and the training signal outputted from said training signal generating means is selected by said second selector, and for converting a carrier frequency corresponding to a minimum value of a sum into corrective data as an estimated initial value based on said carrier frequency; and frequency offset estimating means for estimating corrective data based on the output signal from said inversely correcting means, using the estimated initial value from said initial value estimating means as an initial corrective value, when the stored contents of said memory are selected by said first selector and the output signal from said decision means is selected by said second selector, and for outputting the estimated corrective data to said correcting means.

5. An adaptive equalizer according to claim 4, wherein said inversely correcting means comprises:

complex conjugate converting means for converting the corrective data from said frequency offset estimating means into complex conjugate data; and a complex multiplier for multiplying output data from said complex conjugate converting means by said difference output signal.

6. An adaptive equalizer according to claim 4, wherein said frequency offset estimating means comprises:

converting means for converting the output signal from said inversely correcting means into a phase quantity based on the output signal from said inversely correcting means;

first accumulating/adding means for accumulating and adding phase quantities outputted from said converting means for a predetermined period;

second accumulating/adding means for accumulating and adding output phase quantities from said first accumulating/adding means for a predetermined period; and a vector data converter for converting an output phase quantity from said second accumulating/adding means into a unit vector, as the corrective data, which has a phase angle based on the output phase quantity from said second accumulating/adding means.

7. An adaptive equalizer comprising:

a memory for storing an input signal comprising a training signal and data following the training signal;

a modulator for successively modulating a plurality of frequencies, as a carrier, within a predetermined frequency range containing an expected frequency offset with the training signal read from said memory;

a filter for compensating for a transmission distortion to which the input signal is subjected;

a first selector for selecting and supplying one of an output signal from said modulator and stored contents of said memory to said filter;

correcting means for correcting an output signal from said filter with corrective data;

decision means for estimating and outputting symbols of the input signal in response to an output signal from said correcting means;

training signal generating means for outputting a training signal;

a second selector for selecting one of an output signal from said decision means and the training signal outputted from said training signal generating means;

first inversely correcting means for inversely correcting an output signal from said second selector which is corrected by said correcting means, and feeding back an inversely corrected output signal to said filter;

second inversely correcting means for inversely correcting a difference output signal produced by subtracting an output signal of said second selector from the output signal of said correcting means and corrected by said correcting means;

coefficient updating means for updating coefficients of said filter based on an output signal from said second inversely correcting means;

initial value estimating means for adding, per carrier frequency, the output signal from said second inversely correcting means when the output signal from said modulator is selected by said first selector and the training signal outputted from said training signal generating means is selected by said second selector, and for converting a carrier frequency corresponding to a minimum value of a sum into corrective data as an estimated initial value based on said carrier frequency; and frequency offset estimating means for estimating corrective data based on the output signal from said second inversely correcting means, using the estimated initial value from said initial value estimating means as an initial corrective value, when the stored contents of said memory are selected by said first selector and the output signal from said decision means is selected by said second selector, and for outputting the estimated corrective data to said correcting means.

8. An adaptive equalizer according to claim 7, wherein:

said first inversely correcting means comprises:

complex conjugate converting means for converting the corrective data from said frequency offset estimating means into complex conjugate data; and a first complex multiplier for multiplying output data from said complex conjugate converting means by the output signal from said second selector; and said second inversely correcting means comprises a second complex multiplier for multiplying the output data from said complex conjugate converting means by said difference output signal.

9. An adaptive equalizer according to claim 7, wherein said frequency offset estimating means comprises:

converting means for converting the output signal from said second inversely correcting means into a phase quantity based on the output signal from said second inversely correcting means;

first accumulating/adding means for accumulating and adding phase quantities outputted from said converting means for a predetermined period;

second accumulating/adding means for accumulating and adding output phase quantities from said first accumulating/adding means for a predetermined period; and a vector data converter for converting an output phase quantity from said second accumulating/adding means into a unit vector, as the corrective data, which has a phase angle based on the output phase quantity from said second accumulating/adding means.

10. An adaptive equalizer according to claim 4 or 7, wherein said correcting means comprises a complex multiplier for multiplying the output signal from said filter by said corrective data from said frequency offset estimating means.

* * * * *